April 25, 1933.  C. W. VOGT  1,906,183
FROZEN COMESTIBLE PACKAGE
Original Filed Jan. 9, 1932
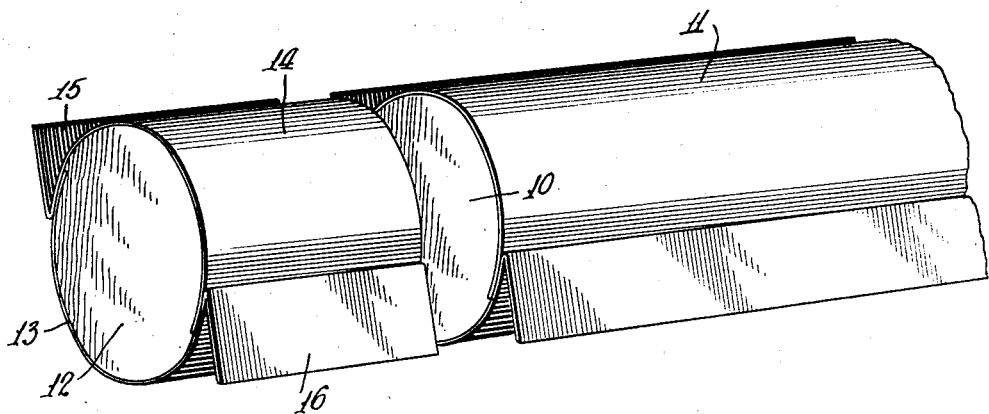
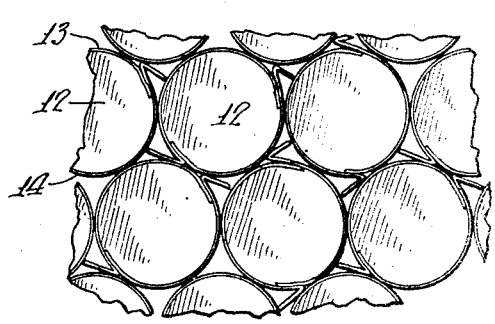
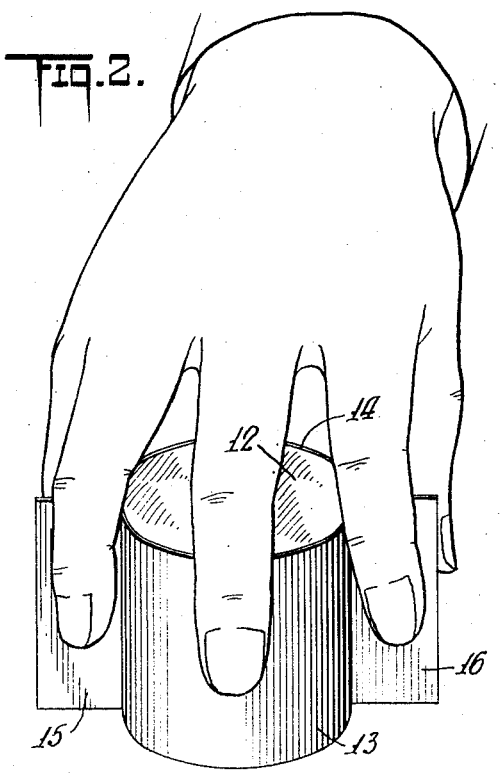
INVENTOR
Clarence W. Vogt
BY
ATTORNEYS Patented Apr. 25, 1933

1,906,183

UNITED STATES PATENT OFFICE

CLARENCE W. VOGT, OF LOUISVILLE, KENTUCKY, ASSIGNOR TO VOGT INSTANT FREEZERS, INCORPORATED, OF LOUISVILLE, KENTUCKY, A CORPORATION OF DELAWARE

FROZEN COMESTIBLE PACKAGE

Original application filed January 9, 1932, Serial No. 585,745. Divided and this application filed July 28, 1932. Serial No. 625,316.

In the ordinary method of dispensing ice cream, individual portions are obtained by dipping into a large can of ice cream and scraping with the dipper until the latter is filled and then depositing the scooped out portion into the dish or container in which it is delivered to the customer. This operation is objectionable in many respects. It takes considerable time and requires a great deal of physical effort, especially if the ice cream is frozen very hard. The ice cream that clings to the side of the can cannot be entirely scraped off by the dipper and constitutes a loss to the dispenser. The separate portions of ice cream obtained are not uniform in size and may vary through comparatively wide limits depending upon the manner and extent to which the dipper is manipulated in the can. The separate portions are not uniform in quality as the pressure involved in the dipping or scraping operation compresses the ice cream to varying degrees and correspondingly reduces the overrun, namely, the amount of air incorporated in the ice cream at the time it is frozen and which renders the ice cream more palatable. The scoop or dipper when not in use is exposed to the atmosphere so that it becomes warm and partially melts the ice cream during the dipping operation.

It is customary to wash or rinse the dipper in warm water between successive uses, particularly if the same dipper is used for different flavors of ice cream and this not only heats the dipper and effects melting of the ice cream, but the water in which the dipper is washed or rinsed is not always fresh and clean.

In the dipping operation the cover of the can is, of course, removed and dirt or other foreign matter may fall into the can to contaminate the cream, and the dispenser often rubs his sleeve against the inside wall of the can, particularly when it is necessary to dip nearly to the bottom of the can to fill the scoop.

It has been proposed to freeze ice cream in individual portions in paper cups or the like, but ice cream in this form is usually eaten directly from the container and is not readily adaptable for use in cones, in soda water or sundaes, or for serving ordinary portions, due to the difficulty in removing the ice cream as a body from the cup or other container in which it is frozen.

It has been proposed to fill long paper tubes with the ice cream and cut the tube and ice cream into sections to form individual portions, but this requires the forcing of the body of ice cream endwise out of the cylindrical paper casing at the time the cream is to be consumed.

The main objects of my invention are to overcome all of the objections heretofore pointed out in connection with the methods of serving ice cream previously employed, to insure uniform portions to each customer, to reduce the liability of contamination, to avoid dipping losses, to avoid shrinkage from dipping operations, to maintain the full original overrun, to permit the ice cream to be served in softer and more palatable form, and to permit quicker and more efficient dispensing.

A further object of my invention is to provide a small package of ice cream of sufficient size to be dispensed as an individual portion and of such form as to permit it to be served in dishes, soda glasses, cones or the like, to permit of its ready packaging in bundles or in containers for storage and transportation, and to permit the wrapper to be very easily and quickly removed when the ice cream is served.

In forming my improved individual service portions the ice cream may be extruded from the freezer and continuously delivered in a partially frozen or soft form and encased in paper or other non-edible sheet material continuously delivered from a roll and folded to progressively form a tube or casing within which it is enclosed during the hardening operation and during shipment and storage.

The continuous production and partial freezing of the ice cream may be accomplished by the use of a continuous freezer which thoroughly incorporates the desired amount of air and continuously delivers the ice cream as a soft bar or rod. For instance, I may use the type of apparatus described and broadly claimed in my prior Patents 1,783,864, 1,783,865, 1,783,866, 1,783,867, issued Dec. 2, 1930 and 1,847,149, issued Mar. 1, 1932, or my copending application Serial No. 602,157, filed Mar. 31, 1932.

The continuously delivered, aerated and partially frozen ice cream may be encased in the wrapper and may be hardened therein and then cut into sections by mechanism of the type disclosed and broadly claimed in my prior Patents 1,810,740, 1,810,863 and 1,810,864, issued June 16, 1931.

The bar of ice cream so continuously produced and encased is preferably of a cross-sectional form and size and the hardened bar is cut into sections of such length that the sections are of suitable volume for use and sale as individual service portions. These portions may be assembled in larger packages or containers as disclosed in my copending application Serial No. 585,745, filed Jan. 9, 1932, of which application this is a division. These individual portions have the wrapping around the periphery, but not across the ends and the wrapping does not form a closed integral tube, but the edges of the wrapping material overlap, with the outer ply free to form a tab, so that the wrapping may be readily peeled off or unrolled from the body of ice cream, leaving the latter free for service in a cone, dish, soda water glass, or the like.

In the form illustrated and claimed herein, the wrapping is formed from two strips of the paper or other sheet material, each extending around slightly more than half the periphery of the body of ice cream, and each strip terminating at one end in a tab or extension portion, whereby the two approximately diametrically opposite tabs may be pulled in opposite directions away from each other to simultaneously remove both strips by an unrolling or peeling action and permit the dropping of the body of ice cream into the desired dish or other container without the use of any tools and without the necessity or liability of the dispenser in any way touching the ice cream itself. The unwrapping action is a very simple one which may be performed with one hand and thus the ice cream may be more promptly served in a more sanitary manner than has heretofore been possible.

The block of ice cream is preferably of cylindrical form which facilitates the peeling or stripping off of the wrapper and also readily permits of the block being supported on its flat end on a dish, or the insertion of it in the mouth of an ordinary ice cream cone, or the dropping of the block endwise into an ordinary size soda water glass. The cylindrical form also facilitates the assembling of a plurality of the blocks each setting on end in the larger package or container and leaving spaces whereby the fingers may be inserted between contiguous blocks to pick up any particular block and to readily grasp the tabs which project from the sides. The successive layers of blocks may be separated by a thin sheet of paper or sheet material which seals the ends of the blocks during shipment and storage.

By freezing the cream very rapidly in the primary freezer, the air incorporated therein during such freezing or previously dissolved therein under pressure is in extremely minute bubbles or in solution, the ice crystals are very minute, there is less tendency of sandiness from separated particles of serum solids, the ice cream is smoother, and is more resistant to heat changes. It will melt more slowly after being removed from the cabinet and placed in a dish exposed to room temperature. Thus it is not necessary to maintain the dispensing cabinet at as low a temperature as is the usual practice where the ice cream is stored in bulk in cans, and the ice cream may be served at a little higher temperature and a little softer so that the flavor is more pronounced. Furthermore, it is not necessary to use artificial binders, such as gelatin, or the like, in the mix.

In the accompanying drawing:

Fig. 1 is a perspective view of a portion of a long bar of the ice cream with an individual portion cut from the end thereof, Fig. 2 is a perspective view showing the manipulative action in removing the wrapper, and Fig. 3 is an end view showing a series of individual portions in assembled relationship as stored and shipped.

In the production of the individual service units the partially frozen ice cream with the desired and regulated amount of air incorporated therein, is delivered as a continuously formed rod or bar 10, and at the same time paper is delivered from a roll and bent to form the enclosing casing 11. A mechanism which may be used for accomplishing this result is disclosed and claimed in my copending application Serial No. 628,322, filed August 11, 1932.

The bars are cut into long sections and pass through a hardening chamber in which the final freezing operation takes place. These bars may then be cut into short sections to form the individual service portions, and such portions may be packed in suitable containers or packages, for instance as shown in my copending application Serial No. 585,745.

For cutting and packaging these portions, one may employ the apparatus disclosed and claimed in my copending application Serial No. 658,264, filed February 23, 1933.

The bar is preferably cylindrical in form, and merely as an example it may be approximately 1⅞ inches in diameter and the bar may be cut into sections approximately 1¾ inches long so that the ice cream in about fifty of these individual portions would be equivalent to one gallon. Each service portion thus includes a cylindrical block of ice cream 12. Preferably the wrapping material is delivered from two rolls to form two separate strips covering the opposite sides of the bar, and these, when cut off, with the block 12 form two wrapping strips 13 and 14 each extending slightly more than half way around the block. Each strip has one end overlapping an end of the other strip, and the outer or overlapping end is preferably creased transversely before being applied to the bar of ice cream and is bent outwardly so as to form two tabs or wrapper extensions 15 and 16 at diametrically opposite sides. These blocks may be assembled in a large container, each block standing on end so that the tabs 15 and 16 may extend into the spaces between the blocks as shown in Fig. 3, and the individual portions may be readily picked up by inserting the fingers in said spaces or by grasping the outer cylindrical block at opposite sides. In picking up the block one tab may be grasped between the thumb and finger and the other tab between the third and fourth fingers and by then extending the hand while holding the two tabs, both of the strips 13 and 14 will be partially pulled off or unrolled from the body of the block and to such an extent that the further unwrapping action, due to the action of gravity on the body of the block, will permit the entire block to drop from the wrapper while holding the two wrapper sections as above indicated. Thus in serving the ice cream it is merely necessary to pick the block up in one hand and by extending the fingers the wrapper is pulled off and the block of ice cream released without the necessity of using a spoon or other implement and without bringing the hand into contact with the ice cream itself. In Fig. 2 this method of handling the portion is indicated.

In the present application I am illustrating and claiming only a construction in which the wrapper is formed of two separate strips. The invention more broadly considered may involve only a single strip. Such construction and broad invention, of which the form shown in this application is one embodiment, are claimed in a copending application.

I have described my invention as applied to ice cream, but it will, of course, be obvious that it is equally applicable to other analogous types of frozen confections which are liquid at room temperature, for instance, sherbet, water ice and the like, or for jellies.

I have described the package as an individual service portion, but it will be obvious that by appropriate change of proportions of the forming mechanism, the portion may have larger diameter and greater length, and the portions may be equivalent to half pints, pints or other sized units.

Having thus described my invention, what I claim as new and desire to secure by Letters Patent is:

1. An individual service portion of ice cream or the like, comprising a substantially cylindrical solid block of the ice cream or the like, and a wrapper including a pair of sections of sheet material, each of a width substantially equal to the length of the block and of slightly greater length than half the circumference of the block, one end of each section overlapping one end of the other section, and the overlapping ends of both sections bent outwardly to form tabs whereby upon pulling said tabs in opposite directions the wrapper is removed from the block.

2. As a new article of manufacture, a packaged frozen comestible, comprising a substantially solid block of ice cream or the like, and a wrapper extending around the block and including two separate portions, each extending around substantially one-half of the periphery, and each terminating in a tab, said tabs being at substantially diametrically opposite points, whereby the block may be readily freed from the wrapper by pulling in opposite directions on said tabs.

3. As a new article of manufacture, a package including a solidified body of edible material normally liquid at body temperature, and a paper wrapper formed of two sections each extending approximately one-half of the distance around the block and each section of said wrapper having a projecting tab portion, said tab portions being on opposite sides of said body whereby they may be pulled in opposite directions to remove the wrapper.

Signed at New York in the county of New York and State of New York this 26 day of July A. D. 1932.

CLARENCE W. VOGT.